July 7, 1931.  W. B. MATHEWSON  1,813,183

GREASE DISPENSER

Filed Dec. 23, 1927  2 Sheets-Sheet 1

Inventor.
Wilfred B. Mathewson
by Heard Smith & Tennant
Attys.

July 7, 1931.    W. B. MATHEWSON    1,813,183
GREASE DISPENSER
Filed Dec. 23, 1927    2 Sheets-Sheet 2

Inventor.
Wilfred B. Mathewson
by Heard Smith & Tennant.
Attys.

Patented July 7, 1931

1,813,183

UNITED STATES PATENT OFFICE

WILFRED B. MATHEWSON, OF WEYMOUTH, MASSACHUSETTS, ASSIGNOR TO ROY MANUFACTURING COMPANY, OF QUINCY, MASSACHUSETTS, A CORPORATION OF MASSACHUSETTS

GREASE DISPENSER

Application filed December 23, 1927. Serial No. 242,249.

This invention relates to an apparatus for dispensing grease and other semi-fluid materials and it relates particularly to that type of dispenser comprising a container for the grease having a pump located in the bottom thereof and by which the grease may be pumped from the container to and through a delivery pipe.

In the operation of grease dispensers of this type difficulty is sometimes experienced in feeding the grease to the pump inlet because of the fact that the grease adheres to the walls of the container, especially if the grease is somewhat viscous as some lubricating compounds are, or if it is semi-solid.

One of the objects of my present invention is to provide an improved grease dispenser which is equipped with means operating coincidentally with the pump for cutting the grease from the walls of the container so that the flow of the grease toward the pump inlet will not be retarded by the adherence of the grease to the side walls of the container.

Another object of the invention is to provide an improved grease retainer with means which not only cuts the grease from the walls of the container but also gives the body of the grease within the container a rotary motion thus facilitating the feed of the grease to the pump inlet.

Still another object of the invention is to provide an improved grease dispenser of this type in which the means for cutting the grease from the walls of the container are yieldingly mounted so that they will follow any unevenness or dents in the wall.

The grease which is used for automobile lubrication frequently comes in drums or containers which are provided with an opening in one end and another object of my invention is to provide an improved dispensing pump which can be installed in a container of this type and by which the grease can be pumped directly therefrom.

Other objects of the invention are to provide improvements in grease dispensing apparatus all as will be more fully hereinafter set forth.

In the drawings wherein I have illustrated a selected embodiment of my invention, Fig. 1 is a sectional view through a grease dispenser made in accordance with the invention;

Figure 4:
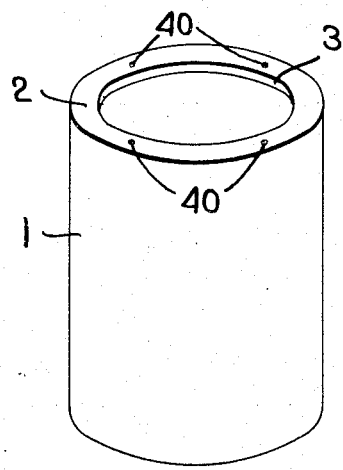
Fig. 4 is a perspective view of the usual grease-containing drum with the cover removed.
Figure 5:
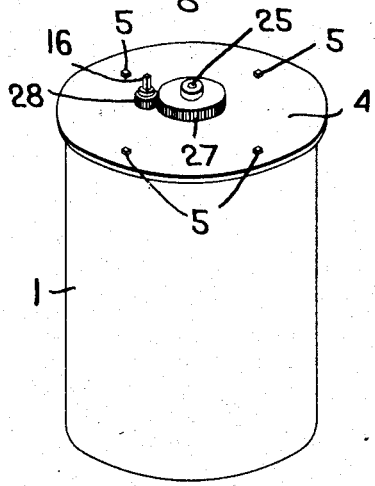
Fig. 5 is a similar view illustrating my improved grease dispenser installed in the drum.

Referring to Fig. 4, 1 indicates a drum or container of the type in which grease or other heavy lubricating compounds are frequently shipped. This container is in cylindrical form and is provided at one end 2 with an opening 3 which is normally closed by a suitable cover or closure, the latter being bolted to the end 2 by suitable bolts which are screw threaded into apertures 40 formed in the end.

According to one feature of my invention I provide a grease-dispensing pump which can be installed in a drum 1 of this type and by means of which the grease may be pumped directly from the drum. This grease dispenser comprises a plate member adapted to be bolted to the end 2 of the drum 1 and thereby to close the opening 3 and a pump device carried by the plate and so arranged that when the plate is bolted to the end 2 of the drum the pump will be located within the drum. The plate is also provided with means for operating the pump from the exterior thereof. In the construction herein shown the arrangement is such that after the pump-carrying plate has been attached to the drum thereby closing the opening 3 said drum or container is then turned bottom side up so that the pump-carrying plate is on the bottom thereof and the pump is thus located in what is then the bottom of the container.

An advantage resulting from this construction is that the pump may be located in the bottom of the container without the necessity of pushing the pump through the body of grease as would have to be done if the pump were entered through the opening in the top of the container and the container was not inverted.

The pump-carrying plate is indicated at 4 and it is provided with bolts 5 situated to be screw threaded into the openings 40 so that when the plate 4 is secured to the end 2 of the drum said plate closes the opening 3. Situated on one side of the plate is a gear pump indicated generally at 6, said pump having the usual pump housing provided with the inlet 7 and the discharge 8 and also having the usual pump gears in the housing. The pump is located on the inside of the plate 4 when the latter is attached to the container and is, therefore, within the container. The outlet or discharge port 8 communicates by a pipe connection 9 with a flexible delivery pipe 10, the pipe connection 9 extending through the plate 4 to the exterior thereof so that the delivery pipe 10 is on the exterior of the plate and container. The shaft 11 of one of the gears of the gear pump extends through the plate 4 and is adapted to be connected to a suitable driving mechanism for operating the pump.

In using the device the cover for the opening 3 is first removed from the drum 1 and the plate 4 installed with the pump 6 on the inside of the drum. The drum or container is then turned bottom side up and supported on the plate 4, thus placing the pump in the bottom of the container. By operating the shaft 11 the pump may be operated to pump grease from the container through the delivery pipe 10. By this arrangement the pump is located in the bottom of the container at the point where it should be for pumping grease therefrom and this location of the pump is secured without having to force the pump down through the body of grease as would be necessary if the container were not inverted.

Any suitable means for operating the pump may be employed. In the construction shown I have provided a motor for this purpose which is mounted on a support 12 that also forms a support for the container or drum 1. This support may conveniently be in the form of a platfom having wheels 13 so that it can be readily moved about. The platform is shown as having a plurality of rests 14 to receive the plate 4 and said platform has journalled thereon a driving gear 15 adapted to be operatively connected with the shaft 11.

I have herein shown the end 16 of the shaft 11 as square and the gear 15 as provided with a square socket 17 into which the square end of the shaft may be received. This gear is journalled in a suitable bearing 18 mounted on the carriage 12 and may be driven in any appropriate way. In the illustrated embodiment of the invention said gear is driven from a motor 19 also mounted on the carriage 12. The gear 15 is shown as a bevel gear which meshes with a bevel pinion 20 on a shaft 21 journalled in the carriage 12, said shaft being connected to the motor shaft through reducing gearing 22.

With this construction the connection between the driving gear 15 and the shaft 11 is a separable connection which permits the drum or container 1 with the attached plate 4 to be removed from or replaced on the carriage 12.

In the operation of a grease pump of this type difficulty is sometimes experienced in securing the continuous feed of the grease to the pump inlet partly because of the tendency of the grease to adhere to the walls of the container and partly because the body of grease will not readily flow or gravitate downward. Even if the grease does flow yet if it is at all viscous the amount adhering to the wall of the container is sometimes such that the pump will cease to function when the container is only partially empty.

One feature of my invention is the provision of means which operates coincidentally with the pump for scraping or cutting the grease from the walls of the container and thus assisting its flow toward the pump inlet and another feature of the invention is the provision of means which not only cuts the grease from the walls of the container but also gives the body of grease within the container a rotary motion which facilitates its flow toward the pump inlet. For this purpose I have provided one or more scrapers 23 which are situated adjacent the walls of the container and are carried around in contact with the wall as the pump operates. In the illustrated embodiment of the invention there are two such scrapers and these are carried on the end of arms 24 which extend from a shaft 25 that is located axially of the container. The shaft is journalled at one end in a bearing 26 formed on the plate 4 and said shaft extends through the plate and is provided with a gear 27 outside of the plate which meshes with a gear 28 on the shaft 11. As the pump is rotated, therefore, the shaft 25 is also rotated thereby carrying the scrapers 23 around in contact with the walls of the container and continually cutting the grease therefrom.

I will preferably make the gears 27, 28 of such relative proportions that the shaft 25 will rotate at a less speed than the pump shaft, as a relatively slow movement of the scrapers or cutters 23 is sufficient for the purpose.

In the type of drum shown in Fig. 4, and which is illustrative of drums or containers in which grease for lubrication purposes is commonly shipped, the opening 3 is usually smaller than the diameter of the container or drum.

In installing the plate 4 and the pump in the drum it is necessary that the scrapers 23 should pass through the opening 3 and in order to permit this to be done where the opening is of less size than the diameter of the drum or container I propose to pivotally connect the scrapers 23 to the arms 24.

Each scraper is formed at each end with an arm 29 extending at right angles thereto and these arms are pivotally connected to the ends of the arms 24 as shown at 30. The arms 24 are of a dimension to permit them to be passed through the opening 3 and by turning the scrapers 23 about their pivots 30 into the dotted line position Fig. 3 the arms 24 with the scrapers thereon may be passed in through the opening 3.

Figure 1:
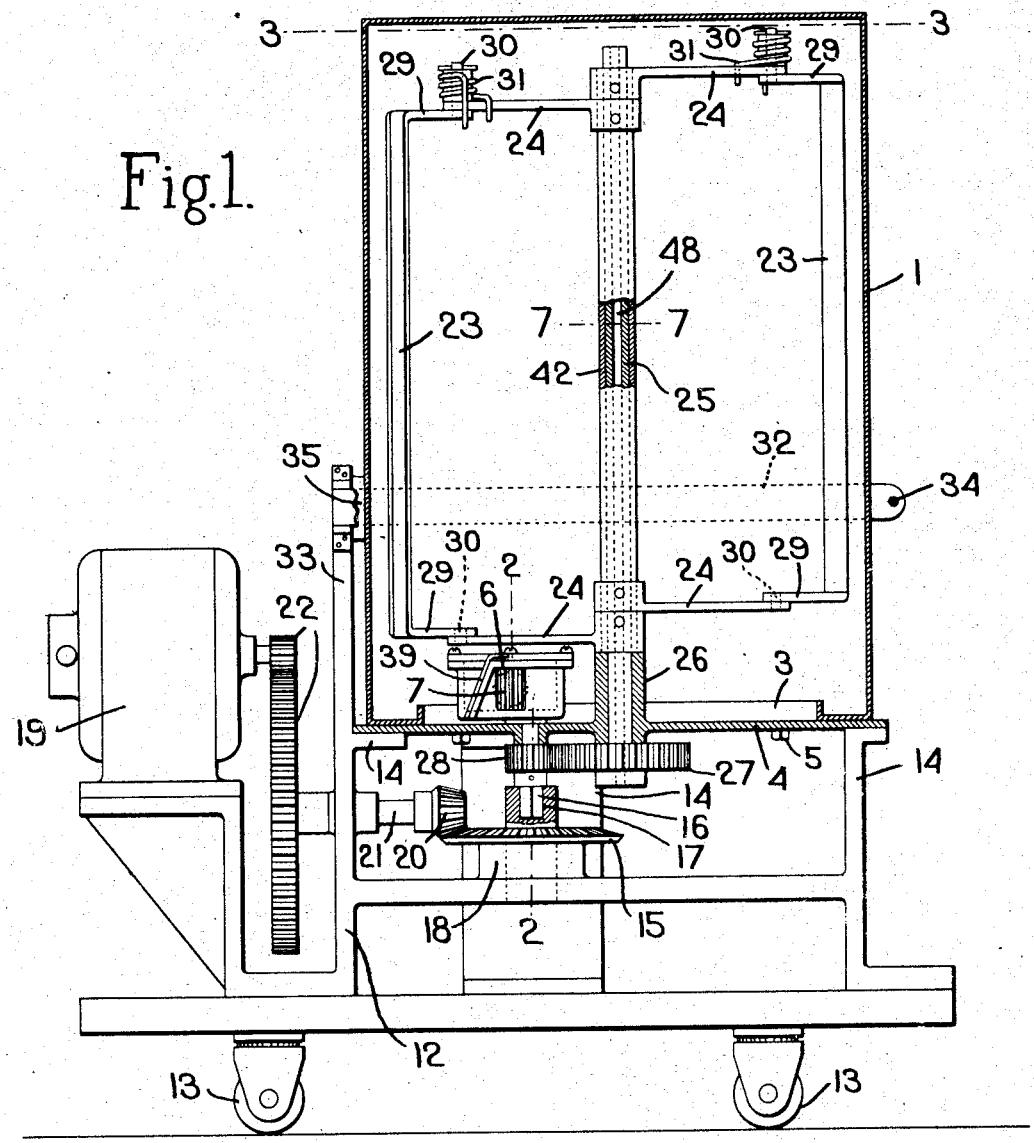
Figure 2:
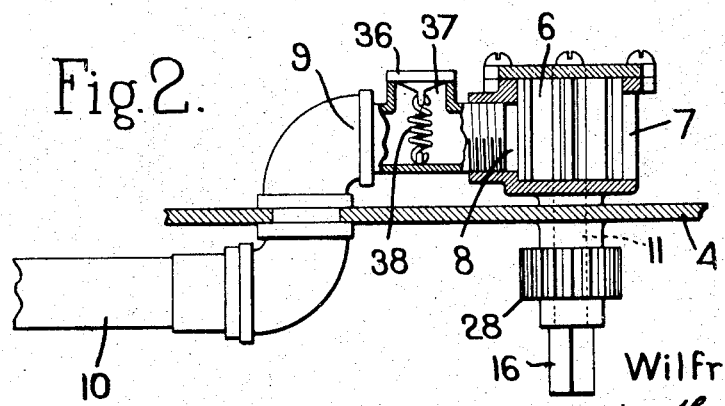
Fig. 2 is an enlarged section on the line 2—2, Fig. 1.
Figure 7:
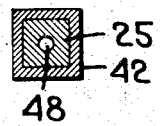
Fig. 7 is a section on the line 7—7, Fig. 1.
Figure 3:
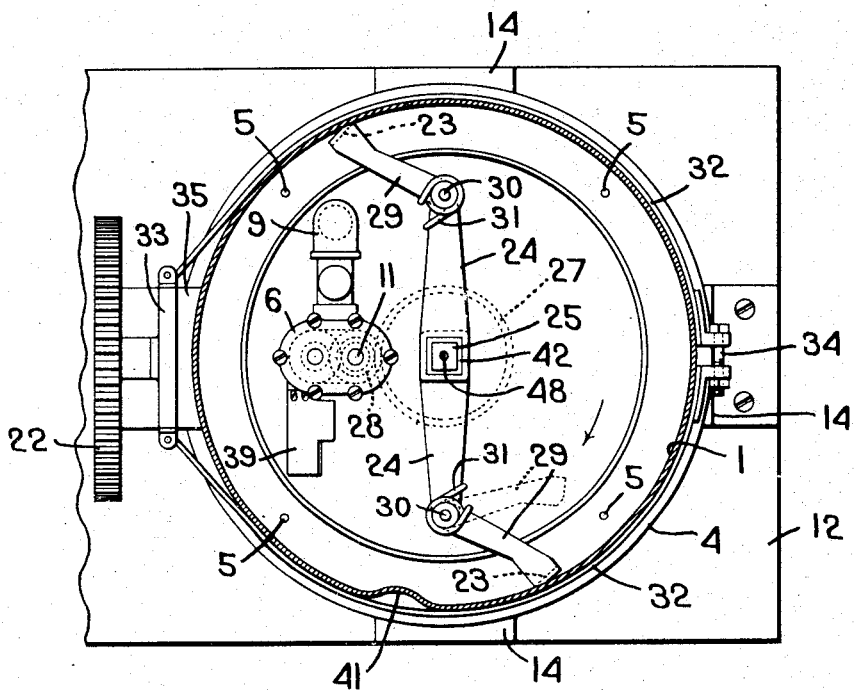
Fig. 3 is a section on the line 3—3, Fig. 1.

The scrapers may be arranged to be either pulled or pushed around the wall of the container. In Fig. 3 I have shown a construction where the scrapers are pulled forwardly, each scraper being situated slightly in the rear of the arm to which it is attached. Fig. 3 shows the direction of rotation of the shaft 25 and scrapers. With this construction I propose to provide a spring 31 for each scraper which will yieldingly hold the scraper in contact with the wall of the container. These springs are associated with the pivots 30 and each is arranged to bear at one end against the arm 24 and at the other end against the arm 29 of the scraper. This construction not only permits the scrapers to be folded into a position so that they can be inserted through the opening 3 but it provides a yielding pressure for each scraper which will yieldingly hold it against the wall of the container and will allow it to yield or give in passing over any unevenness in the wall such as is formed by the indentation 41.

In shipping these grease containers it not infrequently happens that the walls become dented or deformed more or less and the construction shown permits the scrapers to function correctly in spite of any such deformation.

Figure 6:
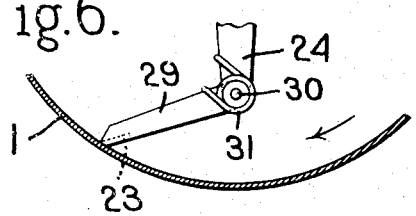
Fig. 6 is a fragmentary view showing a modification.

In Fig. 6 I have shown a construction where the scraper is situated in advance of the arm 24 so that the scraper is pushed around against the wall of the container. Since, however, the scraper is pivoted to the arm it will yield as necessary to follow any unevenness in the wall of the container.

As the grease is cut or freed from the wall of the container it is given a rotary motion by the rotation of the cutters and the arms and this rotary motion is an important factor in maintaining a proper feed of the grease to the pump inlet. It will be noted that the pump is provided with an inclined deflecting plate 39 which is situated at one side of the inlet. The rotation of the body of grease within the container is in the direction of rotation of the shaft 25 as will be obvious and as this grease thus rotates the lower portion thereof is engaged by the deflector plate 39 and is deflected thereby into the pump inlet. By reason of the fact that the grease is kept free from the walls of the container and is also given a rotary motion the body of grease will settle or flow downwardly in the container as grease is pumped therefrom and during this downward flow the deflector 39 continually deflects the grease into the pump thus providing a continuous and uninterrupted flow of grease to the pump.

In order to facilitate the removal of the scrapers from the container after it has been emptied of grease I propose to mount the arms 24 on a sleeve 42 which is secured to the shaft 25. The shaft 25 is a square shaft and the sleeve 42 has a square opening in which the shaft is received. This sleeve is loosely mounted on the shaft but will be rotated thereby because of the square cross section of the shaft. During the operation there will be no tendency for the sleeve to rise on the shaft as the scraper and sleeve will be held in position by gravity.

When the pump and scraper are to be removed from the container the container with the plate 4 bolted thereto is first removed from the platform, the separable connection between the shaft 11 and gear 15 permitting this, and then the bolts 5 are taken out and the plate 4 with the pump thereon and the shaft 25 is removed from the container. During this operation the shaft 25 is simply withdrawn from the sleeve 42. After the plate 4 with the pump has been completely removed then the opening 3 is unobstructed so that the operator can reach into it and fold the scrapers into a position to permit them to be removed through the opening 3.

Any suitable means may be employed for holding the container 1 on the platform or carriage 12 during the operation of the pump. In the construction herein illustrated the carriage 1 is provided with a clamp by which the container 1 is clamped thereto. This clamp comprises the two flexible clamping straps 32 which are attached at one end to a post 33 rising from the carriage and are adapted to encircle the container 1, the free ends of the straps 32 being clamped together by a clamping bolt 34. The post 33 has a rest 35 which engages one side of the container and against which the container is clamped by the clamping straps 32.

The pipe connection 9 is shown as provided with a relief valve which provides for by-passing the grease back into the container in case the delivery pipe is closed or obstructed when the pump is operating. This relief valve is shown at 36 and it normally closes a by-pass opening 37, said valve being yieldingly held to its seat through a spring 38.

The shaft 25 is provided with a vent opening 48 which extends axially thereof and through which air may be admitted to the upper end of the container as the grease is pumped to prevent the formation of vacuum conditions.

While I have illustrated herein a selected embodiment of my invention I do not wish to be limited to the constructional features shown.

I claim:

1. In a grease dispenser, the combination with a container, of a pump in the bottom of the container for pumping grease therefrom, rotary means to cut the grease from the side walls of the container, driving means, and means to operate both the pump and the cutting means therefrom, said cutting means having a rotary movement only while in operation.

2. In a grease dispenser, the combination with a container, of a pump in the bottom thereof for pumping grease therefrom, a scraper extending parallel to the side walls of the container to cut the grease from the said walls, means for operating both the pump and the scraper simultaneously, and means for holding the scraper yieldingly in engagement with said wall.

3. In a grease dispenser, the combination with a container in the form of an original package and having an opening in one end, of a closure for said opening detachably secured to the container, a pump carried by the closure and situated within the container, means to operate the pump, a scraper extending parallel to the side walls of the container, and means to actuate the scraper from the pump-operating means.

4. In a grease dispenser, the combination with a container in the form of an original package and having an opening in one end, of a closure for said opening detachably secured to the container, a pump carried by said closure and situated within the container, pump-operating means, and means carried by the closure but operated by the pump-operating means for cutting the grease from the walls of the container as the pump is operated.

5. In a grease dispenser, the combination with a container having an opening in one end, of a closure for said opening detachably secured to the container, a pump carried by said closure and situated within the container, and means carried by the closure for cutting the grease from the walls of the container as the pump is operated, said means being insertable into the container through said opening when the closure is applied to the container.

6. In a grease dispenser, the combination with a container having an opening in one end, of a closure for said opening detachably secured to the container, a pump carried by the closure and situated within the container, a support on which the closure is removably mounted, the latter in turn constituting a support for the container, and means on the support for operating the pump.

7. In a grease dispenser, the combination with a container having an opening in its lower end, of a closure for said opening detachably secured to the container, a pump carried by a closure and situated inside of the container, said pump having a driving shaft extending through the closure, a support on which the closure is removably mounted, and means on the support for operating the pump shaft.

8. In a grease dispenser, the combination with a container having an opening in its lower end, of a closure for said opening detachably secured to the container, a pump carried by the closure and situated inside of the container, said pump having a driving shaft extending through the closure, a support on which the closure is removably mounted, a driving member on the support having a separable driving connection with said shaft, whereby the container with the closure attached is separable from the support.

9. In a grease dispenser, the combination with a container having an opening in its lower end, of a closure for said opening removably secured to the container, a pump carried by said closure and situated within the container for pumping grease from the container, means also carried by said closure for cutting the grease from the sides of the container as the pump is operated, a support on which the closure is removably mounted, a driving member carried by the support, and separable driving connections between the driving member and the pump.

10. In a grease dispenser, the combination with a container, of a pump in the bottom thereof for pumping grease therefrom, and rotary means to cut the body of the grease clear from the sides of the container and comprising scrapers extending parallel to the wall of the container, said scrapers causing the body of grease to rotate in the container.

11. In a grease dispenser, the combination with a container, of a pump in the bottom thereof for pumping the grease therefrom, a deflector plate adjacent the pump inlet and means operating coincidentally with the pump to cut the grease free from the sides of the container and to rotate the body of grease within the container, the deflector acting on the rotating body of grease to deflect grease into the pump inlet.

12. In a grease dispenser, the combination with a container having an opening in its bottom, of a closure for said opening removably secured to the container, a pump carried by the closure and situated within the container, means for operating the pump, a square shaft journalled in the closure and extending axially of the container, gearing connecting said shaft with the pump, a sleeve loosely mounted on said shaft, and scrapers carried by said sleeve and adapted to engage the walls of the container as the shaft rotates and cut the grease therefrom.

13. In a grease dispenser, the combination with a container having an opening in one end of less diameter than the container, of a closure for said opening removably secured to the container, a pump carried by said closure on the interior thereof, scrapers within the container for scraping grease from the walls thereof, folding arms supporting the scrapers and in turn supported by the closure, the folding action of the arms permitting the latter to be inserted through the opening in the container when the closure is applied thereto, driving means, and means for operating both the pump and the scraper therefrom.

In testimony whereof I have signed my name to this specification.

WILFRED B. MATHEWSON.